United States Patent Office 3,168,523
Patented Feb. 2, 1965

3,168,523
1-AMINO-4-DIBENZOCYCLOHEPTENYL-
PIPERAZINES
John W. Cusic, Skokie, and Peter Yonan, Chicago, Ill.,
assignors to G. D. Searle & Co., Chicago, Ill., a corporation of Delaware
No Drawing. Filed Apr. 27, 1964, Ser. No. 362,951
3 Claims. (Cl. 260—268)

The present invention relates to a group of novel compounds which are substituted aminopiperazines wherein the substituent is a dibenzocycloheptenyl group. More particularly, the present invention relates to compounds having the following general formula

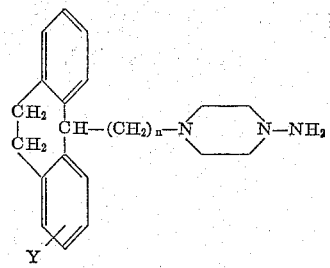

wherein Y is selected from the group consisting of hydrogen, methyl, and halogen; and $n$ is a whole number between 0 and 1 inclusive.

The halogens referred to above include fluorine, chlorine, bromine, and iodine.

The compounds of this invention possess valuable pharmacological properties. In particular, they have activity as pepsin-inhibitors. In addition, these compounds possess anti-biotic activity against a variety of organisms. Thus, they inhibit the growth of the bacterium *Diplococcus pneumoniae*, the protozoa *Tetrahymena gelleii* and the alga *Chlorella vulgaris*; they also inhibit the germination of seeds of Trifolium.

The organic bases of this invention form nontoxic acid addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of the present invention are conveniently prepared by the reduction of the corresponding 1-dibenzocycloheptenyl-4-nitrosopiperazine. Various reducing agents can be used for this purpose although lithium aluminum hydride is particularly preferred. The intermediate nitroso compound can be obtained from the reaction of 1-nitrosopiperazine with a 5-halo-10,11-dihydro-5H-dibenzo[a,d]cycloheptene. It should be obvious that various substituents can be present on the aromatic portion of the dibenzocycloheptenyl structure without interfering with this reaction. Alternately, the nitroso compounds can be obtained by reacting a dibenzocycloheptenylpiperazine with nitrous acid to give the desired N-nitroso compound.

Those compounds where the piperazine structure is not attached directly to the dibenzocycloheptenyl structure can be obtained by the reaction of an appropriate dibenzocycloheptenylcarboxylic acid chloride with 1-nitrosopiperazine followed by reduction of both the nitroso group to amino and reduction of the carbonyl group to methylene.

The following examples are presented to further illustrate the present invention; they should not be construed as limiting it in spirit or in scope. In these examples, quantities are indicated in parts by weight and temperatures in degrees centigrade (° C.).

*Example 1*

A mixture of 23 parts of 5-chloro-10,11-dihydro-5H-dibenzo[a,d]cycloheptene, 12 parts of 1-nitrosopiperazine, 20 parts of potassium carbonate, 5 parts of sodium iodide and 320 parts of 2-butanone is stirred and refluxed for 16 hours. The resultant mixture is filtered to remove salts and the solvent is evaporated from the filtrate under reduced pressure. The resultant residue is dissolved in chloroform and the chloroform solution is washed with water and dried and the solvent is evaporated under reduced pressure to leave a crystalline residue. Ether is added to this residue which is then filtered. The product obtained in this way is 1-(10,11-dihydro-5H-dibenzo[a,d]-cyclohepten-5-yl)-4-nitrosopiperazine and it melts at about 193–194° C. after recrystallization from a mixture of chloroform and ether.

*Example 2*

A solution of 21 parts of 1-(10,11-dihydro-5H-dibenzo-[a,d]cyclohepten-5-yl)-4-nitrosopiperazine in 280 parts of hot tetrahydrofuran is added portionwise, with stirring, to a suspension of 8 parts of lithium aluminum hydride in 420 parts of tetrahydrofuran. This addition is carried out over a period of 1 hour at a temperature of 40–45° C. The mixture is then heated at 45–50° C. for 2 hours before it is cooled in an ice bath and decomposed by the cautious dropwise addition of water. The mixture is filtered to remove precipitated salts and the solvent is evaporated from the filtrate to leave a residual solid which is mixed with ether and then filtered. The product thus obtained is 1-(10,11-dihydro-5H-dibenzo[a,d]cyclohepten-5-yl) - 4-aminopiperazine and it melts at about 145–146° C. after recrystallization from a mixture of chloroform and hexane. This compound has the following formula

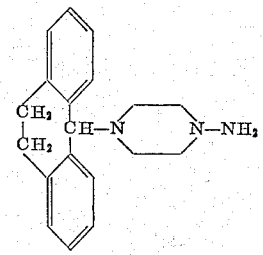

*Example 3*

An equivalent quantity of 3,5-dichloro-10,11-dihydro-5H-dibenzo[a,d]cycloheptene is substituted for the 5-chloro-10,11-dihydro - 5H - dibenzo[a,d]cycloheptene and the procedure of Example 1 is repeated to give 1-(3-chloro-10,11 - dihydro - 5H- dibenzo[a,d]cyclohepten-5 - yl) - 4-nitrosopiperazine. Reduction of this compound according to the procedure described in Example 2 gives 1-(3-chloro-10,11-dihydro - 5H - dibenzo[a,d]cyclohepten - 5 - yl) - 4-aminopiperazine.

*Example 4*

2-methyl-5-chloro-10,11-dihydro-5H-dibenzo[a,d]cycloheptene is reacted with 1-nitrosopiperazine according to the procedure described in Example 1 to give 1-(2-methyl-10,11-dihydro-5H-dibenzo[a,d]cyclohepten-5-yl)-4-nitrosopiperazine. Reduction of this nitroso compound with lithium aluminum hydride according to the procedure described in Example 2 gives 1-(2-methyl-10,11-dihydro-5H-dibenzo[a,d]cyclohepten-5-yl)-4-aminopiperazine.

*Example 5*

A solution is prepared from 17 parts of 10,11-dihydro-5H-dibenzo[a,d]cycloheptene - 5 - carbonyl chloride, 250 parts of chloroform, and 37 parts of triethylamine. To this solution there is added, portionwise with stirring, a solution of 8 parts of 1-nitrosopiperazine in 37 parts of chloroform. The resultant mixture is refluxed for 2 hours and then washed with water and dried. The solution is concentrated to a low volume, ether is added, and the ether solution is cooled to give 1-(10,11-dihydro-5H-dibenzo[a,d]cycloheptene-5-carbonyl)-4-nitrosopiperazine melting at about 177–179° C. after recrystallization from a mixture of chloroform and ether.

A solution of 14 parts of the above nitroso compound in 210 parts of hot tetrahydrofuran is added portionwise to a suspension of 10 parts of lithium aluminum hydride in 700 parts of tetrahydrofuran. The addition is carried out with stirring at a temperature of about 45° C. The mixture is then heated for an additional 2 hours at 45° C. before it is cooled in an ice bath and decomposed by the cautious addition of water. The mixture is filtered to remove the salts, the filtrate is dried, and the solvent is evaporated from the filtrate to give 1-(10,11-dihydro-5H-dibenzo[a,d]cyclohepten-5-ylmethyl)-4-aminopiperazine.

What is claimed is:
1. A compound of the formula

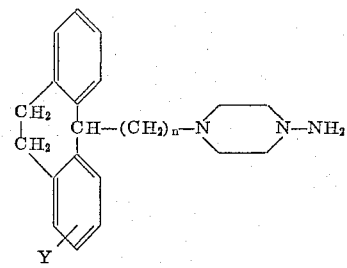

wherein $n$ is a whole number between 0 and 1 inclusive and Y is selected from the group consisting of hydrogen, methyl, and chlorine.

2. 1-(10,11-dihydro-5H-dibenzo[a,d]cyclohepten-5-yl)-4-aminopiperazine.

3. 1-(10,11-dihydro-5H-dibenzo[a,d]cyclohepten-5-yl)-4-nitrosopiperazine.

No references cited.